United States Patent [19]
Otsuka

[11] Patent Number: 4,759,016
[45] Date of Patent: Jul. 19, 1988

[54] TDMA COMMUNICATION SYSTEM HAVING COMMON LOCAL PATH MEDIUM AND LOCAL TIME SLOT FOR INTRAOFFICE CALLS

[75] Inventor: Shigeru Otsuka, Tokyo, Japan
[73] Assignee: NEC Corporation, Japan
[21] Appl. No.: 46,671
[22] Filed: May 4, 1987
[30] Foreign Application Priority Data
  May 9, 1986 [JP] Japan .............................. 61-106345
[51] Int. Cl.⁴ .............................................. H04J 3/16
[52] U.S. Cl. ......................................... 370/95; 370/67
[58] Field of Search ........................ 370/95, 89, 67, 58, 370/56; 379/334

[56] References Cited
U.S. PATENT DOCUMENTS
  4,370,743  1/1983  Moran ..................................... 370/67
  4,583,218  4/1986  Ardon et al. ........................... 370/58
  4,594,705  6/1986  Yahata et al. ......................... 370/67

*Primary Examiner*—Douglas W. Olms
*Attorney, Agent, or Firm*—Laff, Whitesel, Conte & Saret

[57] ABSTRACT

A multiple access communication system includes a central station and terminal stations. Each terminal station serves a plurality of subscriber stations and exchanges with the central station downstream and upstream time-division multiplexed (TDM) signals over first common path medium. The central station comprises a controller that determines first and second time slots in each of the upstream and downstream TDM signals in response to a call-processing signal to permit a talking connection to be established between the first and second time slots and transmitting a control signal to the terminal station. In the terminal station, TDMA interface circuits are associated respectively with the subscriber stations, the interface circuits being normally coupled to the first common path medium for exchanging the TDM signals with the central station. A controller in the terminal station is associated with the interace circuits for transmitting the call-processing signal to the central station controller when a call is to be established between two of the interface circuits. The two interface circuits are coupled to the first and second time slots when the talking connection is established and switched to a third, common time slot on a second common path medium in response to the control signal.

4 Claims, 3 Drawing Sheets

TDMA COMMUNICATION SYSTEM HAVING COMMON LOCAL PATH MEDIUM AND LOCAL TIME SLOT FOR INTRAOFFICE CALLS

BACKGROUND OF THE INVENTION

The present invention relates to a time-division multiple access communication system which provides concentration by switching subscriber telephones to a smaller number of transmission facilities and provides deconcentration by switching the transmission facilities to the subscriber line terminals of an end-office telecommunication switching system.

A multiple access communication system as shown and described in Japanese Pat. No. 59-154828 comprises a central station and a plurality of terminal stations each serving telephone subscribers. The central station is connected to each terminal station by radio channels which are smaller in number than the subscribers. Each terminal station is provided with all switching functions necessary for providing switched connections for outgoing, incoming and intraoffice calls. These functions are implemented by a memory for storing dialed information, a decoder for translating the dialed information to determine a desired route to the central station and other complex circuitry. However, if the system of this type is to be connected to an end office (a telephone office at the lowest level of the hierarchy of the public telephone network) to serve as a "line concentrator" between the end office and the subscribers, each subscriber must have a corresponding line terminal in that end office. In such applications, all intraoffice calls must be routed through the radio transmission channels and folded back through the end office switching network to establish a connection between two subscribers for purposes of charging. For efficient utilization of the valuable common channels, the system disconnects the fold-back connection, establishes a local connection in the terminal station and switches the calling and called subscribers to the local connection when the called telephone answer the call. However, each terminal station must additionally be provided with a subscriber memory for storing call status information to detect intraoffice calls and identify the line numbers of the subscribers of intraoffice calls, and requires a complex switching matrix for establishing the local connection.

SUMMARY OF THE INVENTION

Accordingly, an object of the present invention is to provide a multiple access communication system for exchanging time-division multiplexed (TDM) signals between central and terminal stations over a common long-distance path medium on different time slots of the TDM signals wherein an intraoffice call is switched to a common local path medium and a common local time slot from the long-distance path medium and from the time slots of the TDM signal when a talking connection is established between subscribers served by the same terminal station.

More specifically, a multiple access communication system of the present invention includes a central station and a terminal station. The terminal station serves a plurality of subscriber stations and exchanges with the central station downstream and upstream time-division multiplexed (TDM) signals over first common path medium. The central station comprises a controller that determines first and second time slots in each of the upstream and downstream TDM signals in response to a call-processing signal to permit a talking connection to be established between the first and second time slots and transmitting a control signal to the terminal station. In the terminal station, TDMA interface circuits are associated respectively with the subscriber stations, the interface circuits being normally coupled to the first common path medium for transmitting the upstream TDM signal and receiving the downstream TDM signal. A controller in the terminal station is associated with the interface circuits for transmitting the call-processing signal to the central station controller when a call is to be established between two of the interface circuits. A switching circuit is provided in the terminal station for switching the two interface circuits from the first common path medium to a second common path medium in response to the control signal. A time slot controller is provided for respectively coupling the two interface circuits to the first and second time slots and determining a third time slot in response to the control signal and switching the two interface circuits from the first and second time slots to the third time slot.

Because of the use of a common time slot for local connection, the structure of the terminal station can be simplified. Otherwise, a memory would be required to provide time slot interchange.

BRIEF DESCRIPTION OF THE DRAWINGS

The present invention will be described in further detail with reference to the accompanying drawings, in which.

DETAILED DESCRIPTION

Figure 1:
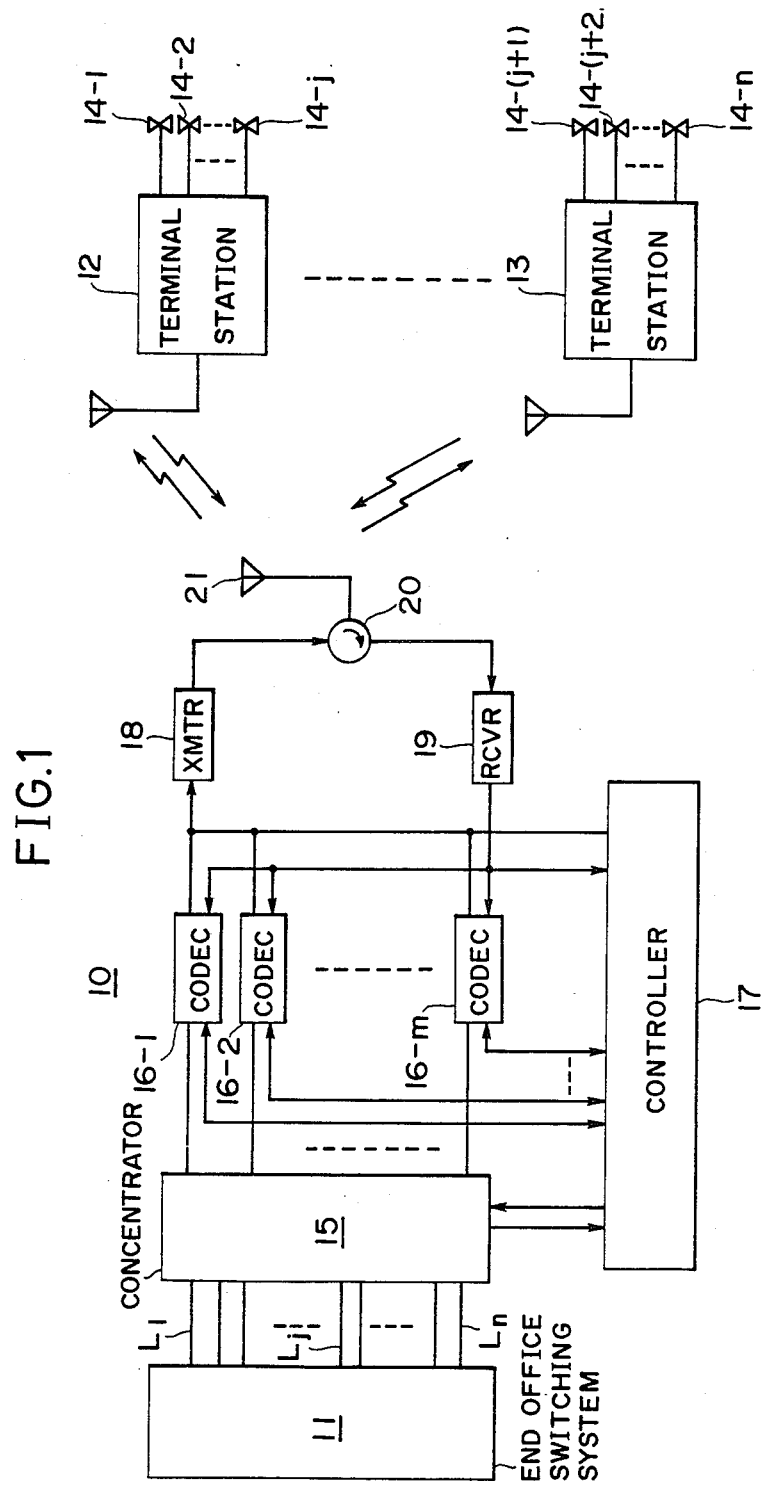
FIG. 1 is an illustration of a digital radio concentrator system.

As represented in FIG. 1, a time division multiple access (TDMA) radio concentrator system of the invention comprises a central station 10 connected to subscriber line terminals L1 through Ln of an end office switching system 11 of the public telecommunication network and a plurality of terminal stations 12 and 13 which are located in remote, thinly populated areas. Terminal station 12 serves a plurality of subscriber stations 14-1 through 14-j such as telephones, telefax machines and computers and terminal station 13 serves a plurality of subscriber stations 14-(j+1) through 14-n. All the subscriber stations 14 have corresponding subscriber line terminals at the end office switching system 11 in a one-to-one relationship.

Central station 10 comprises a line concentrator 15 and a plurality of PCM codecs (encoder/decoders) 16-1 through 16-m (where m is smaller than n). As viewed from the end office switching system, line concentrator 15 provides concentration by switching the subscriber lines to a smaller number of "downstream" time slots multiplexed by codecs 16 and as viewed from the terminal stations it provides deconcentration by switching "upstream" time slots demultiplexed by codecs 16 to the subscriber lines.

Each codec 16 has a hybrid, a PCM encoder for coding an outgoing analog signal coupled through the hybrid from the concentrator 15 and applying the coded outgoing signal on a specified downstream time slot to transmitter 18 and a PCM decoder for decoding an incoming digital signal from a radio receiver 19 on a specified incoming time slot and applying the decoded signal through the hybrid to the concentrator 15. Receiver 19 amplifies and demodulates the upstream radio frequency TDM signal to recover the upstream baseband TDM signals.

A time slot controller 17 is associated with the concentrator 15 and codecs 16 to generate a control signal including address information for identifying source and sink subscriber stations, time slot assignment data identifying time slots, i.e., the codecs to be used by the source and sink subscriber stations and timing information and controls the codecs 16 to multiplex their outputs with a control time slot to which the control signal is inserted. Time slot controller 17 is further responsive to a signal transmitted from the switching system 11 identifying the calling and called subscribers and a special code indicating that these subscribers belong to the same terminal station. Controller 17 inserts this information to each control time slot of a downstream TDM signal. This downstream TDM signal is applied to a radio transmitter 18 which modulates it upon a carrier using a digital modulation technique and feeds it through a duplexer 20 to an antenna 21 for transmission. Controller 17 is also associated with the receiver 19 to receive an upstream control time slot preceding a series of information carrying upstream time slots to generate timing signals for controlling the codecs 16 to demultiplex the upstream TDM signal.

Figure 2:
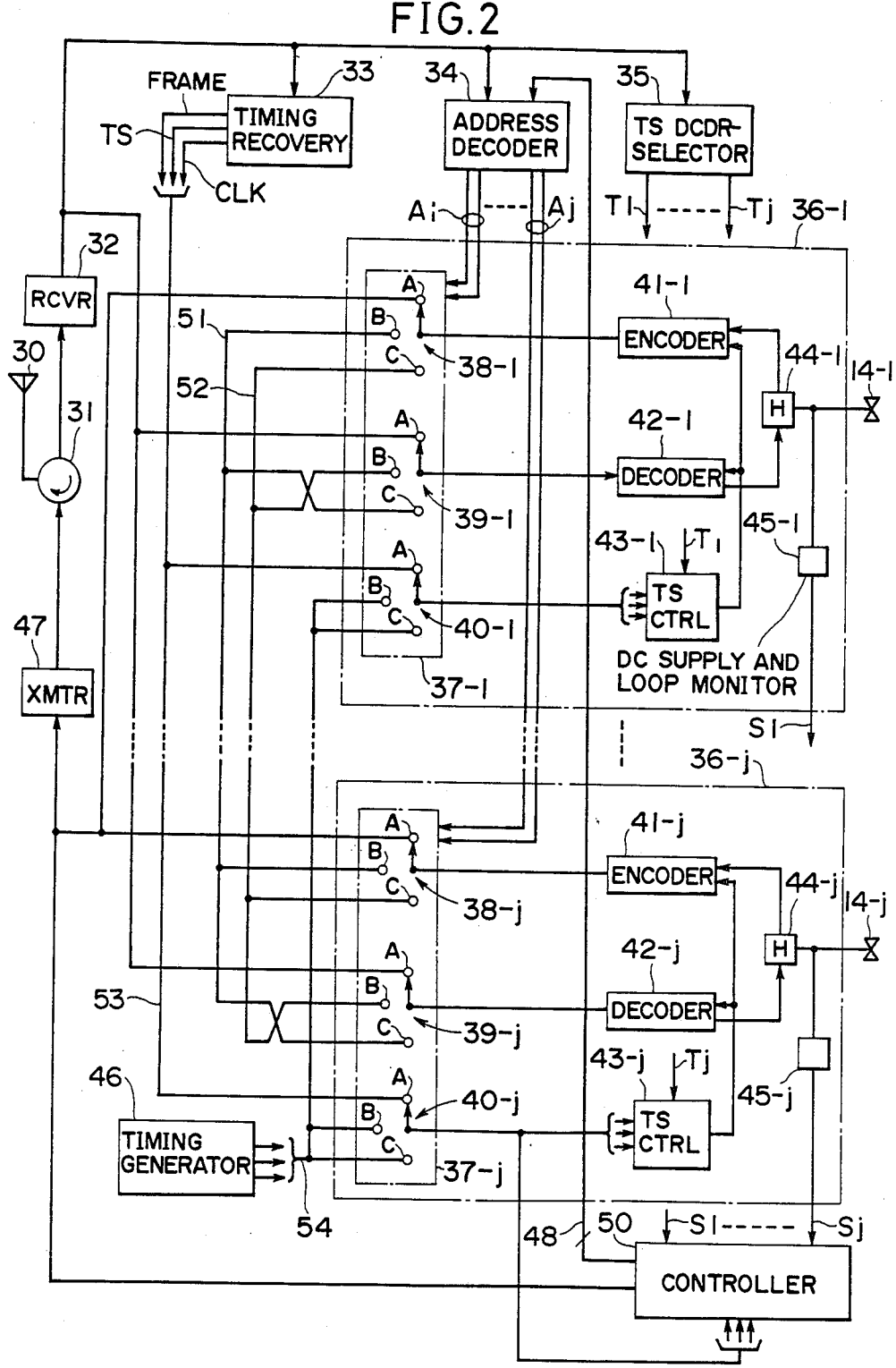
FIG. 2 is a block diagram of each terminal station of the system.

FIG. 2 illustrates details of each terminal station. A downstream TDM signal on the modulated radio-frequency carrier is intercepted by an antenna 30 and applied through duplexer 31 to a radio receiver 32 to recover the baseband TDM signal, which is applied to a timing recovery circuit 33, an address decoder 34 and time slot decoder-selector circuitry 35. Timing recovery circuit 33 recovers clock timing from incoming bit stream and detects frame and time-slot sync codes therefrom and generates frame timing, time-slot timing and clock timing signals. Address decoder 34 is responsive to the special code and the accompanying address codes mentioned above to generate a two-bit switching control signal which is applied selectively to a plurality of pairs of switching control leads Al through Aj. Time slot decoder-selector circuitry 35 decodes the time slot assignment information contained in the control time slot received on a dial tone connection and a ringing connection to apply a time slot selection signal selectively to time-slot control leads Tl through Tj. Time slot decoder-selector circuit 35 is also responsive to the special code received on the establishment of a talking connection to select a single time slot for switching the talking connection to an intraoffice connection and apply a new time-slot selection signal to the time slot control leads to which the previous selection signals have been applied.

Each terminal station includes a plurality of subscriber line interface circuits 36-l through 36-j to which subscriber stations 14-l through 14-j are respectively terminated. Each of the subscriber line interface circuits 36 comprises a switching assembly 37 having a set of three ganged switches 38, 39 and 40 each with switch positions A, B and C. The A positions of switches 38-l through 38-j are connected together to the input of a radio transmitter 47 and the A positions of switches 39-l and 39-j are connected together to the output of receiver 32. The B positions of switches 38-l through 38-j and the C positions of switches 39-l through 39-j are multipled to a common local data line 51 and the C positions of switches 38-l through 38-j and the B positions of switches 39-l thorugh 39-j are multipled to a second common local data line 52. The A positions of switches 40-l through 40-j are multipled to external sync lines 53 which are connected to the outputs of timing recovery circuit 33 and the B and C positions of switches 40-l through 40-j are multipled to internal sync lines 54 which are connected to the outputs of a timing generator 46. Switching assemblies 37-l through 37-j are associated respectively through switching control leads Al through Aj with the address decoder 34 to respond to a 2-bit switching control signal by causing the switches 38, 39 and 40 to be selectively coupled to their A, B and C positions.

Each interface circuit 36 includes a PCM encoder 41, a PCM decoder 42, a time slot controller 43, a hybrid 44 for coupling the subscriber station 14 to the input of encoder 41 and coupling the output of decoder 42 to the subscriber station 14. A DC supply and loop monitor circuit 45 is connected to the subsriber line to supply a talking battery to the subscriber station 14, monitor the off- and on-hook conditions of station 14 ("dc" loop) and communicates this fact to a controller 50. Controller 50 is connected to the input of a radio transmitter 47 to supply to it a call request signal in response to the detection of an off-hook condition by one of the DC supply and loop monitor circuits 45 and further connected on a bus 48 to the address decoder 34 to supply to it a call clearing signal in response to the detection of an on-hook condition by the DC supply and loop monitor circuit 45.

In each interface circuit, the moving contact position of switch 38 is connected to the output of encoder 41, the moving contact position of switch 39 being connected to the input of decoder 42. The moving contact position of switch 40 is connected to the timing control inputs of time slot controller 43. All the switches 38 through 40 are normally coupled to their position A and so the outputs of encoders 41 are connected to the input of transmitter 47, the inputs of decoders 42 are connected to the output of receiver 32 and the timing inputs of time slot controllers 43 are connected to the outputs of timing recovery circuit 33.

Figure 3:
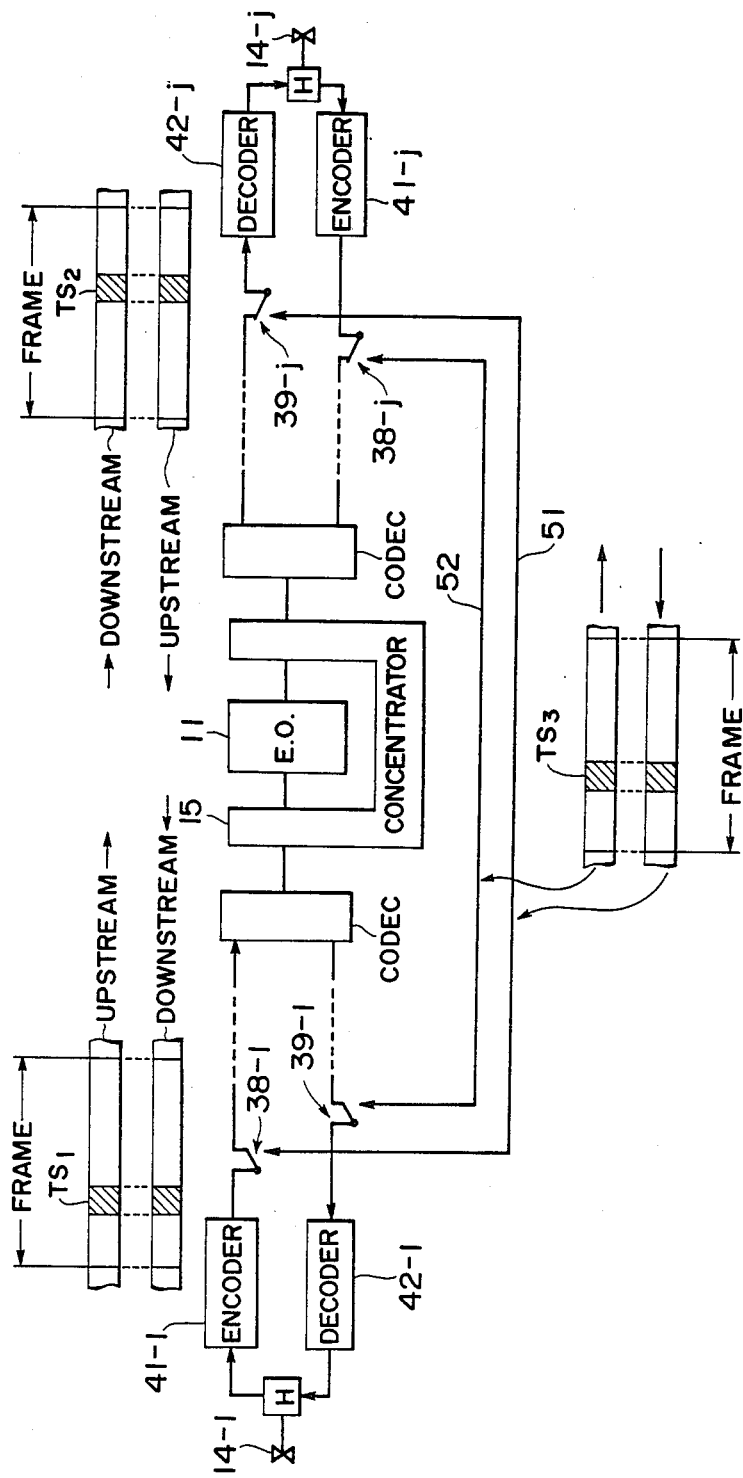
FIG. 3 is a schematic illustration useful for a full understanding of the present invention.

The operation of the TDMA radio concentrator system of the invention will be described with reference to FIGS. 1 to 3. The base station is constantly broadcasting a downstream TDMA signal with each information carrying time slots being filled with information bits or idle bits. The timing recovery circuit 33 of each terminal station monitors the control time slot at the beginning of each frame and generates timing signals including frame sync, time slot sync and clock pulses in order to enable the encoders 41 and decoders 42 to synchronize with the system timing. Assume that subscriber station 14-l originates a call to subscriber station 14-j. Call origination by subscriber station 14-l is detected by DC supply and loop monitor circuit 45-l and controller 50 is informed of this fact and sends a call request signal on an upstream control time slot through transmitter 47.

Central station controller 17 responds to this call request signal by selecting an idle time slot TS1, for example, and transmits a time slot selection signal on the downstream control time slot. This signal is translated by time slot decoder-selector 35 into a slot selection signal that controls the time slot controller 43-l through line Tl to generate a timing signal that allows encoder 41-l to send a digitized signal on the time slot TS1 through the position A of switch 38-*l* to transmitter 47 and allows decoder 42-*l* to receive a downstream TDM signal on the same time slot TS1 through the position A of switch 39-*l* from receiver 32. At the same time, the central station controller 17 proceeds to activate line concentrator 15 to establish a dial tone connection between the codec 16 which is associated with the selected time slot TS1 and the line terminal L1 of subscriber 14-*l*. Dial tone is thus transmitted on time slot TS1 of the downstream TDM signal to subscriber station 14-*l*. Dialing information from the calling subscriber station 14-*l* is transmitted over the selected upstream time slot TS1 to the central station 10 and decoded by the associated codec 16 into analog dialing information and supplied through the line terminal L1 to the end office switching system 11. An intraoffice connection is established in the switching system 11 between line terminals L1 and Lj and a ringing signal is applied through line Lj to the concentrator 15. Switching system 11 knows that the calling and called party belong to the same terminal station and applies a special code indicative of this fact and address codes identifying both subscriber stations through concentrator 15 to controller 17. These signals are stored in a memory of the controller 17 for later transmission on the downstream TDM signal on establishment of a talking connection which occurs when the called subscriber goes off hook and the ringing signal is tripped.

In response to a ringing signal from the switching system 11, controller 17 selects a downstream time slot TS2, for example, and generates a control signal including the line number Lj of the called party and the time slot number of TS2 and inserts the control signal into a downstream control time slot and further generates a timing signal that causes the codec 16 associated with the time slot TS2 to digitize a speech signal that appears on line terminal Lj and sends the digitized signal on downstream time slot TS2.

On receiving the downstream TDM signal, time slot decoder-selector 35 of the terminal station 12 identifies the called subscriber station 14-*j* from the address field of the control time slot and communicates a time slot selection signal to time slot controller 43-*j* on control lead Tj so that it enables the decoder 42-*j* to decode the ringing signal on time slot TS2 into an analog signal to ring the called party station 14-*j*.

When the subscriber station 14-*j* answers the call, the DC supply and loop monitor circuit 45-*j* detects an off-hook and notifies this fact to controller 50, which in turn causes a ring trip signal to be sent on an upstream control time slot and received by central station controller 17 to trip the end-office ringing signal to establish a talking connection between line terminals L1 and Lj. In this talking connection, the encoders 41 and decoders 42 of both subscribers are connected to the positions A of the associated switches 38 and 39. End office switching system 11 now starts a count operation for charging the calling subscriber station 14-*l*. Simultaneously, central station controller 17 reads the special code and the accompanying address codes from the memory and send them on a downstream control time slot.

On receiving the special code contained in the downstream TDM signal, address decoder 34 is activated to apply a first two-bit switching signal on leads Al to switching assembly 37-*l* to cause its switches 38-*l*, 39-*l* and 40-*l* to switch from position A to position B and apply a second two-bit switching signal on leads Aj to switching assembly 37-*j* to cause its switches 38-*j*, 39-*j* and 40-*j* to switch from position A to position C. Alternatively, the first switching signal causes switches 38-*l*, 39-*l* and 40-*l* to switch from position A to position C and the second switching signal causes switches 38-*j*, 39-*j* and 40-*j* to switch from position A to position B.

Time slot decoder-selector 35 responds to the special code and the accompanying address codes by selecting an idle time slot TS3, for example, from among a plurality of time slots which are exclusively available for intraoffice talking connections and applies a TS3-identifying time slot selection signal on control leads Tl and Tj to time slot controllers 43-*l* and 43-*j*.

It is seen that the output of encoder 41-*l* of the calling subscriber 14-*l* is now connected through common local data line 51 to the input of decoder 42-*j* of the called subscriber 14-*j* and the output of encoder 41-*j* of the called subscriber is connected through common local data line 52 to the input of decoder 42-*l* of the calling subscriber. In addition, the time slot controllers 43-*l* and 43-*j* and controller 50 are now switched out of connection from the timing recovery circuit 33 and switched into connection with the local timing generator 46 through internal sync lines 54.

Immediately following the transmission of the special code and accompanying address codes, central station controller 17 updates a memory that stores the busy/idle status of the information carrying time slots to vacate the time slots TS1 and TS2 and signals the switching system 11 through concentrator 15 to disconnect the intraoffice connection between line terminals L1 and Lj.

The talking connection previously established on the time slots TS1 and TS2 by way of the switching office 11 is therefore disconnected and a new talking connection established on the common time slot TS3 over the common local data lines 51 and 52.

When one of the calling and called subscribers goes on hook, controller 50 sends a call clearing signal through transmitter 47 and applies a disconnect signal on control bus 48 to address decoder 34 to cause switching assemblies 37-*l* and 37-*j* to return to their normal A positions. In response to the call clearing signal, controller 17 signals the end office switching system 11 through concentrator 15 to terminate the charging count operation.

During the intraoffice call, battery supplies to transmitter 47 and receiver 32, which are the major power consumptive units of each terminal station, can be cut off for power saving purposes if no other calls are in progress. Because of the use of a common time slot for the intraoffice connection, a memory, which would otherwise be required for time slot interchange, is not necessary.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A multiple access communication system having a central station and a terminal station, said terminal station serving a plurality of subscriber stations, said central station and said terminal station exchanging downstream and upstream time-division multiplexed (TDM) signals over first common path medium, comprising:

first control means in said central station for determining first and second time slots in each of said upstream and downstream TDM signals in response to a call-processing signal, establishing a connection between said first and second time slots of each TDM signal and transmitting a control signal to said terminal station;

time-division multiple access interface circuits associated respectively with said subscriber stations and normally coupled to said first common path medium for transmitting said upstream TDM signal and receiving said downstream TDM signal;

second control means associated with said interface circuits for transmitting said call-processing signal to said first control means when a call is to be established between two of said interface circuits;

second common path medium;

switch means responsive to said control signal for switching said two interface circuits from said first common path medium to said second common path medium; and time slot control means for respectively coupling said two interface circuits to said first and second time slots of each TDM signal and responsive to said control signal for determining a third time slot and switching said two interface circuits from said first and second time slots to said third time slot.

2. A multiple access communication system as claimed in claim 1, further comprising timing recovery means connected to said first common path medium for recovering a timing signal from said downstream TDM signal and timing generator means for generating a timing signal, wherein said second common path medium comprises:

a pair of first and second data lines connected to said interface circuits; and a pair of first and second sync lines connected respectively to said timing recovery means and said timing generator means, wherein said switch means includes means for coupling said interface circuits to said first sync line to said timing recovery means to allow said interface circuits to synchronize with the recovered timing signal and responsive to said control signal for switching said two interface circuits from said first sync line to said second sync line to allow said two interface circuits to synchronize with the generated timing signal.

3. A multiple access communication system having a central station connected to a telecommunication switching system and a terminal station connected over first common path medium to said central station, said terminal station serving a plurality of subscriber stations, comprising:

time-division multiplexer demultiplexer means for multiplexing signals from said switching system into a downstream time-division multiplexed signal and transmitting it to said terminal station over said first common path medium and demultiplexing an upstream time-division multiplexed signal received over said first common path medium into signals for application to said switching system;

first control means for determining first and second time slots in each of said upstream and downstream time-division multiplexed signals in response to a call-processing signal to permit a talking connection to be established over said first and second time slots through said telecommunication switching system and transmitting a control signal to said terminal station in response to the establishment of said talking connection;

time-division multiple access interface circuits connected respectively to said subscriber stations for transmitting said upstream time-division multiplexed signal to said central station and receiving said downstream time-division multiplexed signal therefrom;

second control means associated with said interface circuits for transmitting said call-processing signal to said central station when a call is to be established between two of said interface circuits;

second common path medium;

switch means for normally coupling said interface circuits to said first common path medium and switching said two interface circuits from said first common path medium to said second common path medium in response to said control signal; and time slot control means responsive to said control signal for selecting a third time slot and switching said two interface circuits from said first and second time slots to said third time slot.

4. A multiple access communication system as claimed in claim 1, further comprising timing recovery means connected to said first common path medium for recovering a timing signal from said downstream TDM signal and timing generator means for generating a timing signal, wherein said second common path medium comprises:

a pair of first and second data lines connected to said interface circuits; and a pair of first and second sync lines connected respectively to said timing recovery means and said timing generator means, wherein said switch means includes means for coupling said interface circuits to said first sync line to said timing recovery means to allow said interface circuits to synchronize with the recovered timing signal and responsive to said control signal for switching said two interface circuits from said first sync line to said second sync line to allow said two interface circuits to synchronize with the generated timing signal.

* * * * *